United States Patent [19]

Granz et al.

[11] Patent Number: 4,782,469

[45] Date of Patent: Nov. 1, 1988

[54] ULTRA-SOUND SENSOR

[75] Inventors: Bernd Granz, Oberasbach; Georg Naser, Zirndorf; Helmut Reichenberger, Eckental, all of Fed. Rep. of Germany

[73] Assignee: Siemens Aktiengesellschaft, Munich, Fed. Rep. of Germany

[21] Appl. No.: 115,756

[22] Filed: Oct. 30, 1987

[30] Foreign Application Priority Data

Nov. 4, 1986 [DE] Fed. Rep. of Germany ....... 3637494

[51] Int. Cl.$^4$ ............................................. H04R 17/00
[52] U.S. Cl. .................................... 367/157; 367/163; 310/800; 310/349
[58] Field of Search ............... 367/157, 163, 174, 191, 367/141, 164, 165; 310/800, 349, 365; 381/173, 190; 73/DIG. 4; 128/24 A

[56] References Cited

U.S. PATENT DOCUMENTS

| | | | |
|---|---|---|---|
| 3,970,862 | 7/1976 | Edelman et al. | 307/88 ET |
| 4,135,108 | 1/1979 | Besson | 310/349 |
| 4,433,400 | 2/1984 | DeReggi et al. | 367/163 |
| 4,517,665 | 5/1985 | DeReggi et al. | 310/800 |
| 4,558,249 | 12/1985 | Lerch et al. | 381/90 |
| 4,653,036 | 3/1987 | Harris et al. | 310/800 |

FOREIGN PATENT DOCUMENTS 086531 2/1983 European Pat. Off. .
894774 10/1958 Fed. Rep. of Germany .

OTHER PUBLICATIONS

IEEE Transactions on Sonics and Ultrasonics, vol. SU-30, No. 5, Sep. 1983, pp. 295-303; G. R. Harris et al.: "An Analysis of Pulsed Ultrasonic Fields as Measured by PVDF Spot-Poled Membrane Hydrophones".

*Primary Examiner*—Charles T. Jordan
*Assistant Examiner*—John W. Eldred
*Attorney, Agent, or Firm*—Kenyon & Kenyon

[57] ABSTRACT

The ultrasound sensor (2) of the invention comprises a polymer foil (4) which is supported in its outer region and is piezoelectrically activated at least in one portion (42). The portion (42) is coupled electrically to a first electrode (200) in the form of an adjacent, i.e., touching pin. A second electrode (8), in the form of a grid (214) connected to ground and/or a ring (216) connected to ground, is physically separated from the activated portion (42). The pin (200) is connected to the first input of an amplifier (210). The second input thereof is connected to ground. The metallic take-off at the activated zone (42) results in high sensitivity of the ultra-sound sensor (2) which is provided particularly for the measurement of shock waves with a high pressure amplitude and which finds application in lithotripsy.

10 Claims, 1 Drawing Sheet

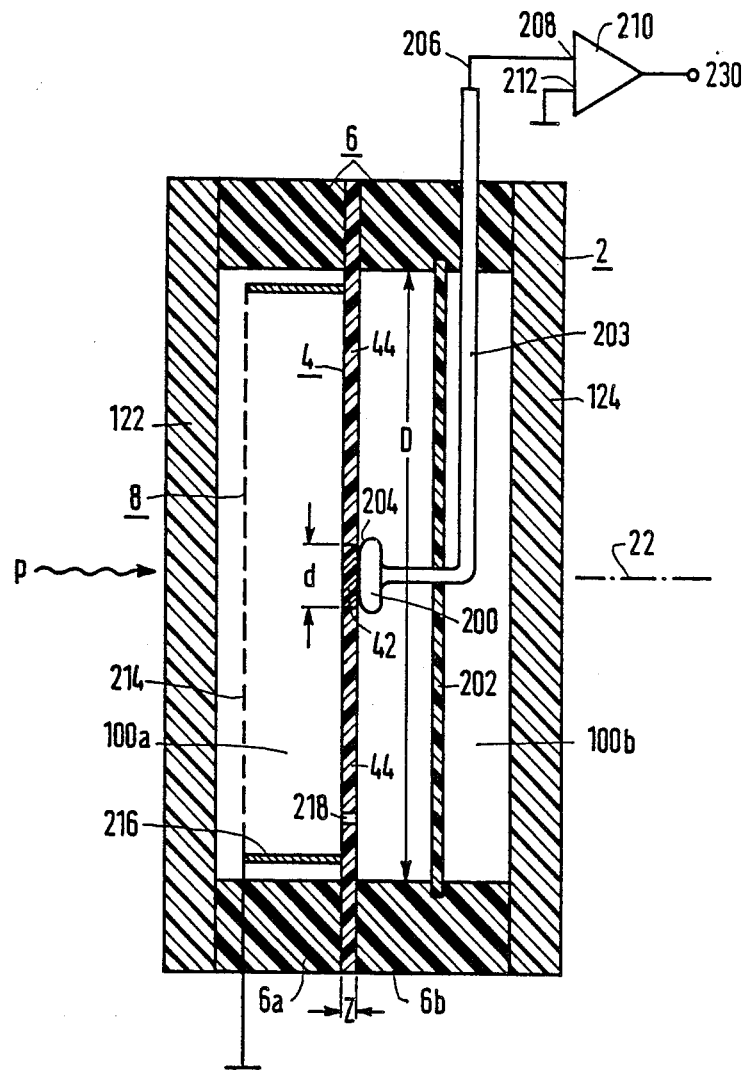

ULTRA-SOUND SENSOR

BACKGROUND AND SUMMARY OF THE INVENTION

The invention relates to an ultrasound sensor with a polymer foil which is fastened at least at its outer portion to a support body and which is piezoelectrically activated at least in part of the area which is electrically coupled to electrodes.

Shock waves in the ultrasound range are short pulses with components of high frequencies of more than 1 MHz and frequently very high pressures of more than 1 kbar. These shock waves are used, for instance, in lithotripsy for the destruction of concrements, for instance, as kidney stones, as described in greater detail in DE-OS No. 33 28 051. Especially in this medical application it is necessary to measure the shock waves accurately and to monitor the operation of the lithotriptor. To this end, a sensor must be made available which can present the waveform of the shock wave in question with sufficiently large bandwidth. The sensor must furthermore be capable of measuring the wave shape of the shock wave also at the point of the highest pressure, i.e., at the focus where the concrement to be destroyed is placed, in a reproducible manner without being destroyed itself. In other words, it should be possible to measure relatively high pressures of more than 1 kbar reliably, and the sensor itself must be of a rugged design to withstand the high pressures.

At points of lower pressure, diaphragm hydrophones of various designs have heretofore been used as ultrasound sensors (P. A. Lewin, Ultrasonics, September 1981, pages 213 to 216; R. C. Preston et al, J.Phys. E.: Sci. Instrum., vol. 16 (1983), pages 786 to 796). In all cases, the sensor contains as the measuring foil the piezoelectric polymer polyvinylidene fluoride (PVDF) to which metallization is applied.

With PVDF, a large bandwidth of, for instance, 10 MHz can be realized. It has been found, however, that all sensor types of the above-mentioned design are not suitable for detecting shock waves at the focus of a shock wave source, since they are not able to withstand the high pressure at the focus, the amplitude of which can be in the range of about 1 kbar ($10^8$Pa) with a steep rising flank of the shock wave, where the rise time can be less than 1 $\mu$sec. Ultra sound sensors of the above-mentioned design are ordinarily inoperable after a few shock wave pulses. Especially vulnerable are the electrical contacts in the vicinity of the sensitive point of the sensor, i.e., near the activated region of the polymer foil, which are destroyed when shock waves are detected.

In the European patent application with the publication No. 0 227 985, a sensor of the type mentioned at the outset is proposed which can detect shock waves also at the focus of a lithotriptor in a time-wise stable manner. In this sensor, the metallic electrical contacts are physically separated from the piezoelectrically active zone of the PVDF diaphragm or foil. This arrangement can lead to a relatively low sensitivity.

It is an object of the present invention to provide an ultrasound sensor of the type mentioned at the outset with a piezoelectrically activated polymer foil which can be used particularly for measuring high-energy shock waves with adequate sensitivity and which has a long service life.

According to the invention, the object is achieved by the provision that a first electrode rests against the activated portion of the polymer foil and a second electrode is arranged physically separated from the piezoelectrically activated portion.

Upon the arrival of an ultrasonic shock wave pulse, charges are generated in the piezoelectrically activated region of the polymer foil. The first electrode loosely touches the piezoelectrically activated portion, (i.e., contacts the polymer foil under resilient pretension), for instance, on the back of the polymer foil, which consists particularly of PVDF. The first electrode is connected to the first input of a preamplifier. The second electrode is designed, for instance, as a grid and is connected to ground. The second input of the preamplifier is likewise connected to ground. In this manner, the signal is metallically taken off from the piezo-active point of the polymer foil and is amplified. Due to the design of the invention, sufficiently high sensitivity and long service life of the measuring sensor are achieved, especially for high pressures.

Further advantages and embodiments of the invention will be seen from the detailed description of an exemplary embodiment of the invention, making reference to the figure.

BRIEF DESCRIPTION OF THE DRAWING

The figure illustrates a side cross sectional view of an ultrasound shock wave sensor with a polymer foil according to the invention.

DETAILED DESCRIPTION

According to the figure, the ultrasound sensor 2 includes for the detection of shock waves a thin polymer foil or polymer diaphragm 4 of, in particular, circular disc form which is clamped taut in the interior of a ring-shaped support body, here between two clamping rings 6a, 6b. The clamping rings 6a, 6b are part of a cylindrical housing with an inside diameter D, made of insulating material. On the inner end faces of the clamping rings 6a, 6b, the polymer foil 4 therefore rests firmly on the rim side. The polymer foil 4 preferably consists of polyvinylidene fluoride (PVDF). The polymer foil 4 is polarized in its central portion 42 and is therefore piezoelectrically activated only at that portion 42. The piezoelectrically activated portion 42 is surrounded by an annular region 44 which is piezeoelectrically inactive. The polymer foil 4 itself is not provided with any metallic contacts. The region 42 is arranged with rotational symmetry with respect to a sensor axis 22 extending perpendicularly to the flat sides of the polymer foil 4. In the preferred application, it is placed in the focus of the shock wave source of a lithotriptor, not shown. The left-hand end face of the housing is facing the shock wave source which transmits the shock wave pulses p.

The diameter d of the circular central portion 42 is very much smaller than the free diameter D of the polymer foil 4. The thickness Z of the polymer foil 4 is between 10 $\mu$m and 100 $\mu$m and particularly between 25 $\mu$m and 50 $\mu$m. In the present example it has a thickness, for instance, of Z=25 $\mu$m. The diameter d may be, for instance, 1 to 2 mm and the diameter D may be 50 to 100 mm. The diameter d determines the local resolution with which the measurement is made.

As seen in the direction of a shock wave p on the back of the central portion 42, a first electrode 200 in the form of a pin or nail is arranged on a thin bridge or on a bridge 202 of plastic, for instance, plexiglass. The thin bridge 202 which is permeable to ultrasound thus serves as a holding element for the angled-off or bent-off metallic contact pin, i.e., for the electrode 200. The bridge 202 is fastened in the right-hand clamping ring 6b.

The pin 200 has a slightly crowned or slightly rounded head side 204 which is widened relative to the back part 203 and the area of which has the same size as the area of the activated portion 42. The back part 203 of the pin 200 which is bent off at a right angle is brought radially through the clamping ring 6b at a suitable point. The pin 200 is adjusted so that the head side 204 is directly opposite the central portion 42 and touches the latter with a slight mechanical pretension, i.e., resiliently. The pretension can be brought about particularly by the selected type of fastening to the support body 6b. The magnitude of the pretension depends on the location of the feed-through through the ring 6b, the length of the back part 203 and its material. In particular, adjustability (not shown) of the contact pressure of the head side 204 on the surface 42 by mechanical means such as screw displacements can be provided.

The pin 200 is provided with an electric line 206 which leads to the first input 208 of a preamplifier 210. The second input 212 of the preamplifier 210 is connected to ground.

Upon the arrival of a short-wave pulse p, electric charges are generated in the piezoelectrically activated portion 42. The latter are "read out" as a signal from the portion 42 via the electrode 200 and the line 206 and are amplified in the preamplifier 210.

A second electrode 8 is attached on the front side of the polymer foil 4 and is physically separated from the activated portion 42. This second electrode 8 can be designed in different embodiments. In the example shown, the second electrode 8 consists of a metal grid 214 connected to ground and a thin metallic ring 216 also connected to ground. The grounded grid 214 is connected to the ground ring 216 in an electrically conducting manner. The grid 214 is permeable to ultrasound and therefore to shock waves. The metal grid 214 is arranged centrally to the axis 22 and has, approximately, the diameter D. It thus circumscribes the portion 42.

The support rings 6a, 6b are provided on their flat sides facing away from the polymer foil 4 with cover plates 122 and 124, respectively, of highly ultrasound-permeable material. Between the polymer foil 4 and the cover plates 122 and 124 are therefore formed, in each case, a liquid-tight chamber 100a, 100b, which chambers 100a, 100b are filled with a liquid dielectric such as water and are in communication with each other via recesses, small holes or canals 218, in the partition (polymer foil 4) for the purpose of pressure equalization. In one advantageous embodiment, the cover plates 122 and 124 consist of a plastic material and, specifically, a polymer. The dielectric is preferably liquid; it has approximately the same acoustic impedance as the sound-carrying medium which brings the shock wave pulse p to the ultrasound sensor 2. This pulse is taken off as an electrical signal at the output 230 of the preamplifier 210.

An advantage of the ultrasound sensor 2 is the metallic signal take-off at the piezoelectrically activated portion 42. Thereby, the sensitivity of the ultrasound sensor 2 is substantially increased as compared with a capacitive take-off.

What is claimed is:

1. In an ultrasound sensor with a polymer foil fastened to a support body at least at its outer region and which polymer foil is piezoelectrically activated at least at a portion thereof and is electrically coupled to electrodes, an improvement which comprises a first electrode contacting said piezoelectrically activated portion of the polymer foil under resilient pretension, and a second electrode arranged at a position which is physically separated from said piezoelectrically activated portion of the polymer foil.

2. The ultrasound sensor of claim 1, wherein said first electrode is formed to a pin having a rounded head side; the piezoelectrically activated portion of the polymer foil being arranged to rest against said rounded head side under said resilient pretension.

3. The ultrasound sensor of either of claims 1 or 2 wherein said first and second electrodes being electrically coupled to an amplifier.

4. The ultrasound sensor of claim 2 wherein the size of the piezoelectrically activated portion is equal to the area of the rounded head side of said pin which is under said resilient pretension against said portion.

5. The ultrasound sensor according to either of the claims 1, 2 or 4 wherein:
 (a) said piezoelectrically activated portion is arranged in the central part of the polymer foil;
 (b) said polymer foil being clamped at the outer edge thereof by a housing;
 (c) said first electrode being under said pretension against a back side of the polymer foil opposite the side thereof exposed to ultrasound waves;
 (d) said first electrode comprising a bent-off contact pin; and
 (e) said contact pin being resiliently fastened at said housing to provide said resilient pretension against said activated portion.

6. The ultrasound sensor according to either of claims 1, 2 or 4 wherein said polymer foil is provided with at least one opening for the equalization of the pressure on either side thereof.

7. The ultrasound sensor of claim 5 wherein said polymer foil and said housing define two chambers which are separated from each other by said polymer foil.

8. The ultrasound sensor of claim 7, wherein each chamber comprises a clamping ring.

9. The ultrasound sensor of claim 1 wherein said second electrode comprises a metal grid arranged at a spaced position relative to the polymer foil.

10. The ultrasound sensor of claim 9, wherein said metal grid being electrically connected to a metal ring, which metal ring surrounds the piezoelectrically activated portion of said polymer foil.

* * * * *